(12) United States Patent
Langsford

(10) Patent No.: US 8,902,098 B2
(45) Date of Patent: Dec. 2, 2014

(54) PROCESS FOR MINIMISING JAMMER NOISE IN RECEIVER SYSTEMS

(75) Inventor: Peter Alan Langsford, High Roding (GB)

(73) Assignee: BAE Systems PLC, London (GB)

(*) Notice: Subject to any disclaimer, the term of this patent is extended or adjusted under 35 U.S.C. 154(b) by 1051 days.

(21) Appl. No.: 12/988,416

(22) PCT Filed: Apr. 16, 2009

(86) PCT No.: PCT/GB2009/050378
§ 371 (c)(1),
(2), (4) Date: Oct. 18, 2010

(87) PCT Pub. No.: WO2009/127875
PCT Pub. Date: Oct. 22, 2009

(65) Prior Publication Data
US 2011/0034141 A1 Feb. 10, 2011

(30) Foreign Application Priority Data

Apr. 18, 2008 (EP) .................................. 08154813
Apr. 18, 2008 (GB) .................................. 0807090.6

(51) Int. Cl.
*G01S 7/36* (2006.01)
*H01Q 3/26* (2006.01)
*H04B 1/12* (2006.01)
*H04K 3/00* (2006.01)

(52) U.S. Cl.
CPC ............. *H01Q 3/2635* (2013.01); *G01S 7/36* (2013.01); *H04B 1/126* (2013.01); *H04K 3/228* (2013.01)
USPC ................................ 342/16; 342/159; 342/189

(58) Field of Classification Search
CPC ........ G01S 7/36; G01S 7/021; G01S 7/2813; G01S 13/5244; G01S 7/292; H01Q 3/2635; H04B 1/126; H04K 3/228
USPC ................................ 342/13, 16–19, 159, 189
See application file for complete search history.

(56) References Cited

U.S. PATENT DOCUMENTS 4,268,829 A * 5/1981 Baurle et al. ................. 342/380
4,283,767 A * 8/1981 Rountree ...................... 702/194

(Continued)

FOREIGN PATENT DOCUMENTS

DE 38 17 643 C 1 6/1989
EP 2113964 A1 * 11/2009 ............... H01Q 3/26

(Continued)

OTHER PUBLICATIONS

Frey et al., "Adaptive cancellation of stationary interference in the presence of structured nonstationary interference", Signal Processing (2002), vol. 82, No. 11, pp. 1665-1673.

(Continued)

*Primary Examiner* — John B Sotomayor
(74) *Attorney, Agent, or Firm* — Scully, Scott, Murphy & Presser, P.C.

(57) ABSTRACT

A process is disclosed for minimising jammer noise in receiver systems. The process comprises the use of a primary receiver (10) and a plurality of secondary receivers (11) for receiving signals. The process comprises the steps of:—separately correlating the signal received at each of the plurality of 5 secondary receivers with the signal received at the primary receiver;—determining the magnitude of the correlation between signals received at each of the plurality of secondary receivers with the signal received at the primary receiver; and,—minimising the signal received at the primary receiver using those signals received at the secondary receivers for which the magnitude of the correlation with the signal received at the primary receiver is above a threshold value.

15 Claims, 2 Drawing Sheets

(56) References Cited

U.S. PATENT DOCUMENTS

Figure 1:
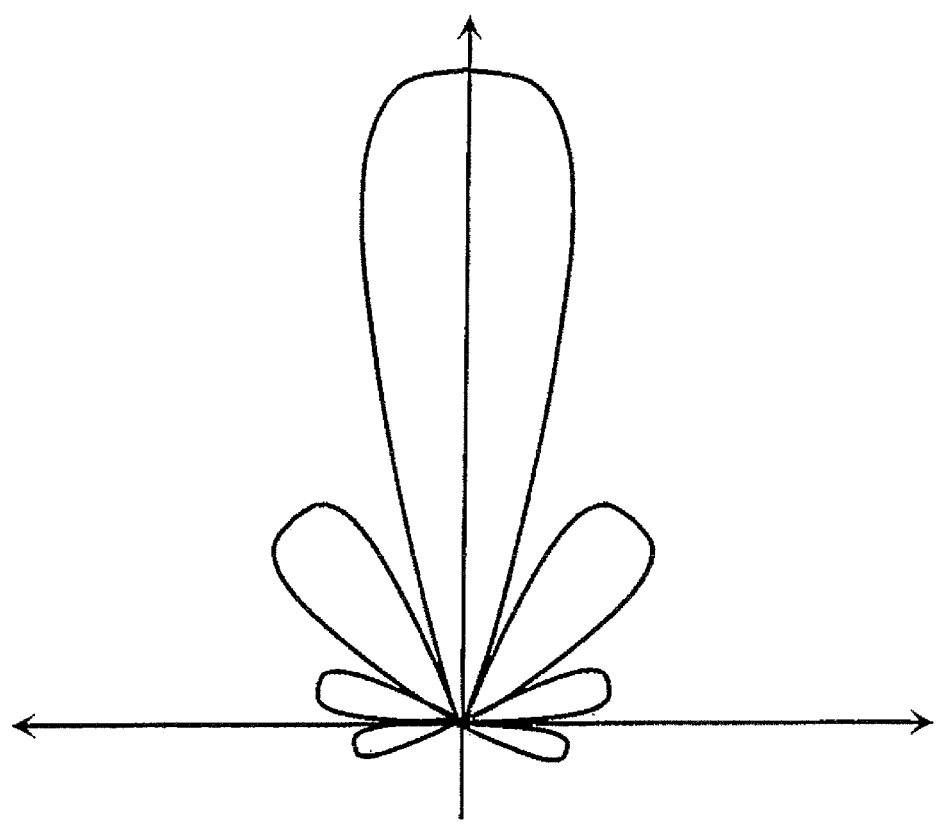

| | | | |
|---|---|---|---|
| 4,561,089 A * | 12/1985 | Rouse et al. | 370/479 |
| H000108 H * | 8/1986 | Gerlach | 342/159 |
| 4,642,643 A * | 2/1987 | Wise et al. | 342/13 |
| 4,891,647 A | 1/1990 | Auvray | |
| 5,359,329 A * | 10/1994 | Lewis et al. | 342/17 |
| 5,381,150 A * | 1/1995 | Hawkins et al. | 342/13 |
| 5,440,228 A * | 8/1995 | Schmidt | 324/76.12 |
| 5,442,365 A | 8/1995 | Lewis et al. | |
| 5,502,448 A | 3/1996 | Cantrell et al. | |
| 5,661,485 A * | 8/1997 | Manuel | 342/13 |
| 5,907,578 A * | 5/1999 | Pon et al. | 375/150 |
| 6,650,271 B1 * | 11/2003 | Simone et al. | 342/16 |
| 6,697,007 B2 * | 2/2004 | Greer | 342/13 |
| 6,762,712 B2 * | 7/2004 | Kim | 342/135 |
| 6,768,444 B2 * | 7/2004 | Langsford | 342/17 |
| 6,867,731 B2 * | 3/2005 | Dizaji et al. | 342/159 |
| 7,362,257 B2 * | 4/2008 | Bruzzone et al. | 342/13 |
| 2003/0210178 A1 * | 11/2003 | Hager et al. | 342/159 |
| 2004/0027268 A1 * | 2/2004 | Langsford | 342/16 |
| 2005/0104770 A1 * | 5/2005 | Bortnyk et al. | 342/189 |
| 2007/0200751 A1 * | 8/2007 | Shinonaga | 342/189 |
| 2008/0219328 A1 * | 9/2008 | Sanada et al. | 375/148 |
| 2011/0034141 A1 * | 2/2011 | Langsford | 455/305 |

FOREIGN PATENT DOCUMENTS

| | | |
|---|---|---|
| GB | 2 188 782 A | 10/1987 |
| GB | 2320384 A * | 6/1998 |

OTHER PUBLICATIONS

International Search Report dated May 26, 2009.
Extended European Search Report dated Jul. 8, 2008.
UK Search Report dated Jul. 17, 2008.
International Preliminary Report on Patentability dated Oct. 28, 2010.

* cited by examiner

PROCESS FOR MINIMISING JAMMER NOISE IN RECEIVER SYSTEMS

The present invention relates to a process for minimising jammer noise in receiver systems and particularly, but not exclusively, to a process for minimising jammer noise in RADAR systems.

Null steering processes provide an electronic-countermeasures facility to counter the threat of hostile RADAR (RAdio Detection And Ranging) jamming. RADAR is a process which relies upon the reflection of radio waves from an object, such as an aircraft. The radio waves are transmitted from a RADAR transmitter and the time interval between their transmission and reception at the RADAR receiver is monitored to determine the distance of the object from the RADAR. By coordinating this measurement with the elevated and azimuthal directions of the transmitted signal, it is possible to determine the position of the object with respect to the RADAR and to track the position of the object in time.

RADAR jamming refers to radio frequency signals originating from sources independent of the RADAR, which transmit in the frequency range of the RADAR. Jamming is problematic to RADAR since the signal reflected from an object is typically weaker than the jamming signal. The jamming signal only needs to travel one-way, namely from the jammer to the RADAR receiver, whereas the RADAR signal travel two-ways (radar-object-radar) and is therefore significantly reduced in power by the time it returns to the RADAR receiver. Accordingly, the relatively strong jamming signal from the object acts to obscure the desired signal reflected from the object.

The radiation patterns of RADAR transmitters are generally directional in nature and comprise a powerful central signal flanked by a series of sidelobes which reduce in power as the angular separation from the central signal increases, as shown in FIG. 1. The response of RADAR to received signals varies in a similar manner to the transmission profile, with signals directed toward the antenna from a direction within the central signal, i.e. within a few degrees of the line of sight of the RADAR, namely boresight, experiencing more gain than those signals which arrive from a direction angularly displaced from the central direction, namely within the sidelobes.

The central signal and side lobes are separated from each other by a series of nodes or nulls, which correspond to angular directions where very little or no transmitted power is directed. Signals received from directions which fall within or close to these nulls will experience very little gain. Accordingly, the function of the null steering processes is to form nulls or positions of minimal gain in directions of noise due to jamming signals. Nulls may be created in any received beam pattern, subject to there being sufficient degrees of freedom to acquire independent noise samples from jamming sources and the necessary processing channels to combine them.

Figure 2:
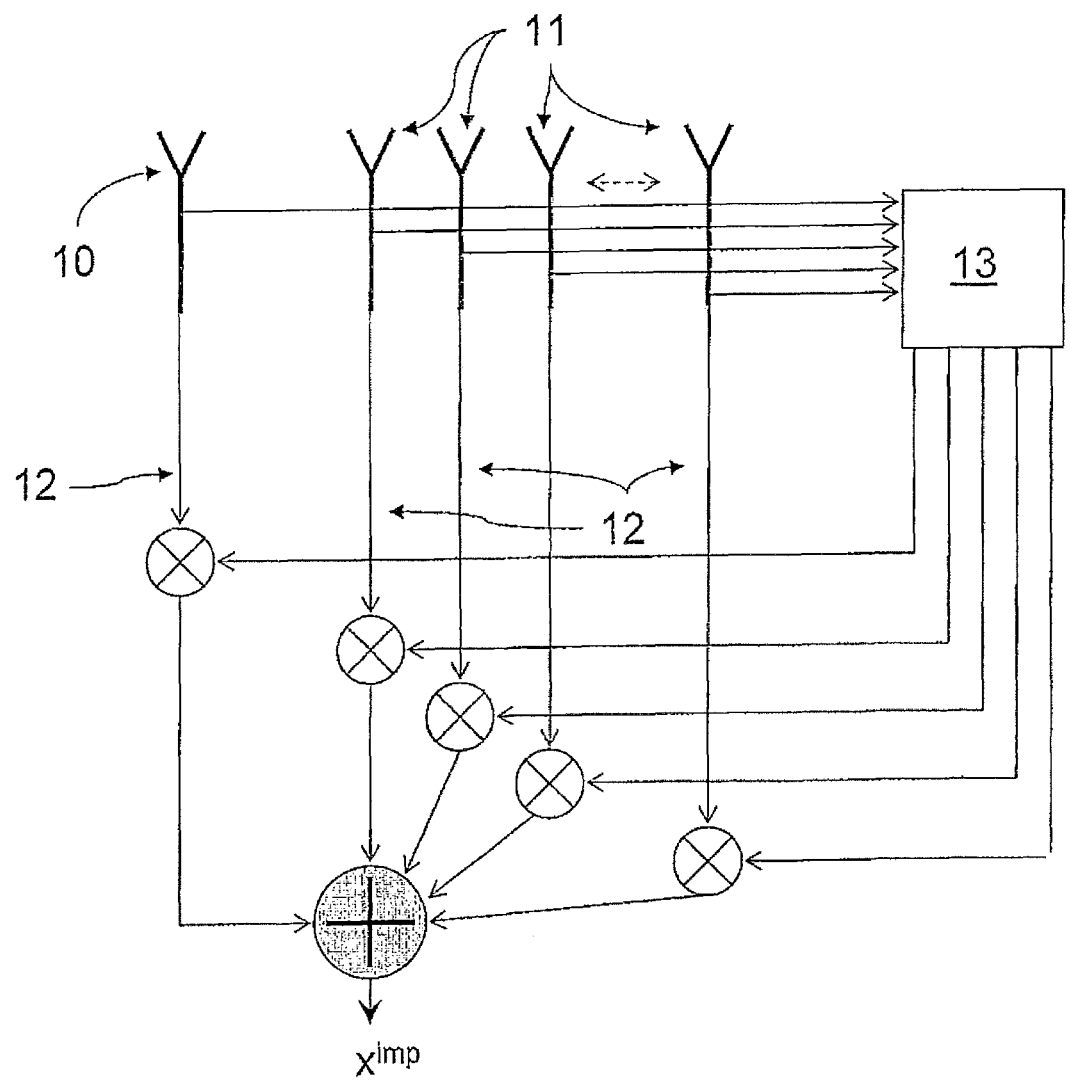

It is known to provide RADAR systems comprising a main antenna having the above gain characteristics, working in parallel arrangement with a series of auxiliary antennas (as shown in FIG. 2) which have a slowly varying gain over the angular "viewing" range. Each of the auxiliary antennas will also be receptive to the desired reflected signal and the undesirable jamming signal, but the gain applied to the reflected and jamming signals will be much less than the main antenna and relatively uniform over the viewing angle. Accordingly, the signals received by the auxiliary antennas will exhibit some degree of correlation with the signal received by the main antenna. Modern RADAR systems embody the main antenna and auxiliary antennas in a single unit having an array of closely spaced antenna elements which operate with a defined phased relationship.

Conventional methods of removing the jamming signals utilise the signals in the auxiliary channels to minimise the signal detected in the main channel. The output from the auxiliary channels is subtracted from the main channel to remove the jamming noise component. However, the jamming signal that appears in each auxiliary will comprise an amplitude and phase that is dependent on its angle of arrival and therefore, different auxiliary channels will comprise different amounts of noise.

To overcome this problem, existing methods apply a weighting factor to each of the signals received from the output channels of the auxiliary receivers to determine the influence of the respective signals in reducing the levels of noise in the main channel. However, with these methods, the signal from the main channel is reduced using the signals output from each auxiliary channel, even in circumstances where the signal output from the auxiliary may be that due to thermal noise alone. In addition to being computationally intensive, this process also results in a reduction of the strength of the desired signal.

We have now devised a process which overcomes the above-mentioned problems.

In accordance with the present invention as seen from a first aspect there is provided a process for minimising jammer noise in receiver systems, the process comprising the use of a primary receiver and a plurality of secondary receivers for receiving signals, the process comprising the steps of:

separately correlating the signal received at each of the plurality of secondary receivers with the signal received at the primary receiver;

determining the magnitude of the correlation between signals received at each of the plurality of secondary receivers with the signal received at the primary receiver; and, minimising the signal received at the primary receiver using those signals received at the secondary receivers for which the magnitude of the correlation with the signal received at the primary receiver is above a threshold value.

For signals output from the secondary receivers which exhibit a level of power correlation with the signal output from the primary receiver that is above the threshold value, then the signal from that secondary receiver having the greatest magnitude of correlated power with the signal output from the primary receiver is preferably used to minimize the level of jammer noise in the primary receiver, producing an improved primary signal.

The minimisation step preferably comprises subtracting the correlated power, obtained by correlating the signal from that secondary receiver having the greatest magnitude of power correlation with the signal output from the primary receiver, from the signal output from the primary receiver and each of the secondary receivers.

This process provides for a more accurate determination of the target object since there is no unnecessary removal of the desired signal. Those secondary receivers that experience levels of jammer noise for which the magnitude of the power correlation with the signal from the primary receiver is below the threshold, are therefore excluded from the minimisation step.

The process preferably further comprises the step of determining weighting factors which are applied to the signals output from each of the plurality of secondary receivers. The weighting factors are calculated from data samples taken from each of the receiver channels using a sequential decorrelation algorithm. The algorithm assumes that the desired signal y(t) at time t can be expressed according to the following equation, $$y(t) = x_0(t) - \sum_{i=1}^{N} w_i x_i(t)$$

where $x_0(t)$ is the output from the primary receiver and $x_i(t)$ is the signal output from the $i^{th}$ secondary receiver channel, i=1...N for N secondary receivers and $w_i$ is the weight to be applied to the signal received from the $i^{th}$ secondary receiver.

RADAR signals are typically transmitted as pulses with a predefined repetition frequency and thus at predefined time intervals. For each transmitted pulse that provides a reflected signal at the primary and secondary receivers, the weighting factor is calculated for each secondary receiver. The weighting factor will be dependent upon the magnitude of the power correlation between the signal output from the primary receiver and the respective secondary receiver and can be expressed mathematically as, $$w_i = \frac{E[x_i^{(n)}(t) x_{N-n}^{(n)}(t)]}{E[x_{N-n}^{(n)}(t) x_{N-n}^{(n)}(t)]}$$

where E[ ... ] denotes the expectation value and $x_i$ is only defined for $0 \leq i \leq N-n$.

Preferably, the signals output from each of the secondary receivers are sorted in order of the magnitude of their power correlation with the signal output from the primary receiver. The magnitude of the correlated power for each secondary receiver is then compared with the threshold value, which is preferably set to be just above the thermal noise. If there is no secondary receiver signal which comprises a level of correlated power above the threshold value, then the process is terminated.

Preferably, that correlated power, obtained by correlating the signal output from that secondary receiver having the highest magnitude of correlated power with the primary receiver, is subtracted from each signal output from the secondary receivers giving a modified signal. The weighting factors for each of the modified signals from each of the secondary receivers are then recalculated in dependence upon the magnitude of the power correlation of the modified signals from each of secondary receivers with the improved signal from the primary receiver. This can be represented as, $$x_i^{(0)}(t) = x_i(t)$$

$$x_i^{(n+1)} = x_i^{(n)}(t) - w_i^{(n)} x_{N-1}^{(n)}(t)$$

It can be seen that at each iteration, n, the signal $x_{N-n}^{(n)}(t)$ which originated from the $(N-n)^{th}$ secondary receiver channel, becomes decorrelated from the other remaining channels.

The magnitude of the correlated powers, obtained by correlating the modified signal from each of the secondary receivers with the improved signal from the primary receiver, are then again sorted in order of highest correlated power. The modified signal from the secondary receiver having the greatest magnitude of power correlation with the improved signal is then used further to minimize the level of jammer noise in the primary channel.

This process is continued until the magnitude of the correlated power for all modified signals output from the secondary receivers with the improved signal from the primary receiver, is below the threshold value. This process ensures that only those signals from the secondary receivers which provide a useful reduction in the jammer noise in the primary channel are used to recover the desired signal.

In accordance with the present invention as seen from a second aspect, there is provided a RADAR receiver system comprising processing means for performing the process of the first aspect.

Preferably, the processing means comprises a RADAR management computer.

The preferred embodiment of the present invention will now be described by way of example only and with reference to the accompanying drawings in which:

FIG. 1 is a graphical representation of a typical radiation pattern emitted from a RADAR; and, FIG. 2 is a schematic representation of the RADAR system embodying the process of the present invention.

Referring to FIG. 2 of the drawings, there is shown a schematic arrangement of a RADAR system. The system comprises a main antenna 10 and a series of auxiliary antennas 11 all of which are arranged to receive signals; with modern RADAR systems, both the main and auxiliary antennas are typically embodied using a phased array of antenna elements (not shown).

The main antenna 10 transmits a burst of pulses at one particular time and looks for a reflected signal over a predetermined time interval. The time at which the data channels 12 are sampled within a pulse repetition interval will depend on the pulse repetition frequency, clutter, namely any undesirable echoes from clouds, sea, mountains etc and the jamming environment.

For pulse repetition frequencies which are sufficiently low that they provide an unambiguous range greater than the range extent of surface clutter, then the first batch of samples after each transmitted pulse, starts at a time corresponding to a range just greater than the range extent of the clutter. This ensures that the reflections from the clutter corresponding to a transmitted pulse are received before the next pulse is sent. This avoids the ambiguity of associating reflected pulses with a particular transmitted pulse and is controlled using the RADAR management computer 13.

Referring to FIG. 2, the signal from each antenna can be expressed as, $$x = [x_0, x_1, \ldots, x_N]$$

and similarly, the weights from each of the auxiliaries can be expressed as, $$w = [w_1, w_2, \ldots, w_N].$$

The improved output signal $x_0^{imp}$ is therefore expressed as, $$x_0^{imp} = x_0 - w_1 x_1 - w_2 x_2 - \ldots w_N x_N.$$

The process of the present invention minimizes the jammer noise in the primary receiver channel by recursively adapting the values of the weights. The improved output power, P, can be expressed as, $$P = E[x_0^{imp}(x_0^{imp})^*],$$

where * indicates the conjugate operation. At each stage of the iteration, only that auxiliary channel which exhibits the greatest level of power correlation with the main channel is used in the minimisation. Moreover, at each iteration, the magnitude of the power correlation between the auxiliary channels and the main channel is compared to a threshold level which is set to just above thermal noise and those channels for which the correlated power is below the threshold level are excluded from the minimisation step. This results in a fast and accurate minimisation of the jammer power in the main channel and thus an effective process for the removal of jamming signals.

While the foregoing has exemplified the application of the process of the present invention to RADAR systems, it is to be appreciated that the process would also find suitable application in other receiver systems including, but not limited to, SONAR systems and communication systems which may be susceptible to interference from jamming signals.

The invention claimed is:

1. A process for minimising jammer noise in receiver systems, the process comprising the use of a primary receiver and a plurality of secondary receivers for receiving signals, the process comprising the steps of:
separately correlating an output signal received from each of the plurality of secondary receivers with an output signal received from the primary receiver;
determining magnitudes of correlation between the signals output from each of the plurality of secondary receivers with the signal output from the primary receiver; and
minimising the signal output from the primary receiver using those signals output from the secondary receivers for which the magnitude of the correlation with the signal output from the primary receiver is above a threshold value;
wherein only those secondary receivers that experience levels of jammer noise for which the magnitude of correlation with the signal output from the primary receiver is above the threshold are used in the minimisation step.

2. A process according to claim 1, further comprising the step of determining weighting factors for each of the signals output from the secondary receivers.

3. A process according to claim 2, wherein the weighting factors are calculated from data samples taken from each of the secondary receivers, using a sequential decorrelation algorithm.

4. A process according to claim 1, wherein only a correlated signal power output from that secondary receiver having the largest magnitude of power correlation with the signal output from the primary receiver, is used in the minimising step.

5. A process according to claim 4, wherein the minimising step comprises subtracting the correlated signal power, obtained by correlating the signal output from that secondary receiver having the largest magnitude of power correlation with the signal output from the primary receiver, from the signal output from the primary receiver to produce an improved primary signal.

6. A process according to claim 5, wherein the minimising step further comprises subtracting the correlated signal power obtained by correlating the signal output from that secondary receiver having the largest magnitude of power correlation with the signal power output from the primary receiver, from the signal output from each of the secondary receivers to produce modified secondary signals.

7. A process according to claim 6, wherein a weighting factor for each modified signal from each of the secondary receivers is recalculated in dependence upon the level of power correlation of each modified signal with the improved primary signal.

8. A process according to claim 1, wherein the signals output from each of the secondary receivers are sorted in order of the level of power correlation with the signal output from the primary receiver.

9. A process according to claim 1, wherein the minimisation step is terminated if there is no signal from a secondary receiver which comprises a level of power correlation with the primary receiver that is above the threshold value.

10. A process according to claim 1, wherein the threshold value is set to be just above the thermal noise.

11. A process according to claim 1, wherein said process is an iterative process that terminates if the signal output from each secondary receiver comprises a level of power correlation with the signal output from the primary receiver that is below the threshold value.

12. A process according to claim 11 wherein at each stage of the iteration, the signal output from each secondary receiver becomes decorrelated with the signal output from the primary receiver.

13. A process according to claim 1, wherein the receiver system is a RADAR system.

14. A RADAR receiver system comprising processing means for performing the process of claim 1.

15. A RADAR system according to claim 14, wherein the processing means comprises a RADAR management computer.

* * * * *